S. B. GOFF.
WATER ELEVATING APPARATUS.
APPLICATION FILED DEC. 18, 1914.
1,166,671.
Patented Jan. 4, 1916.
3 SHEETS—SHEET 2.
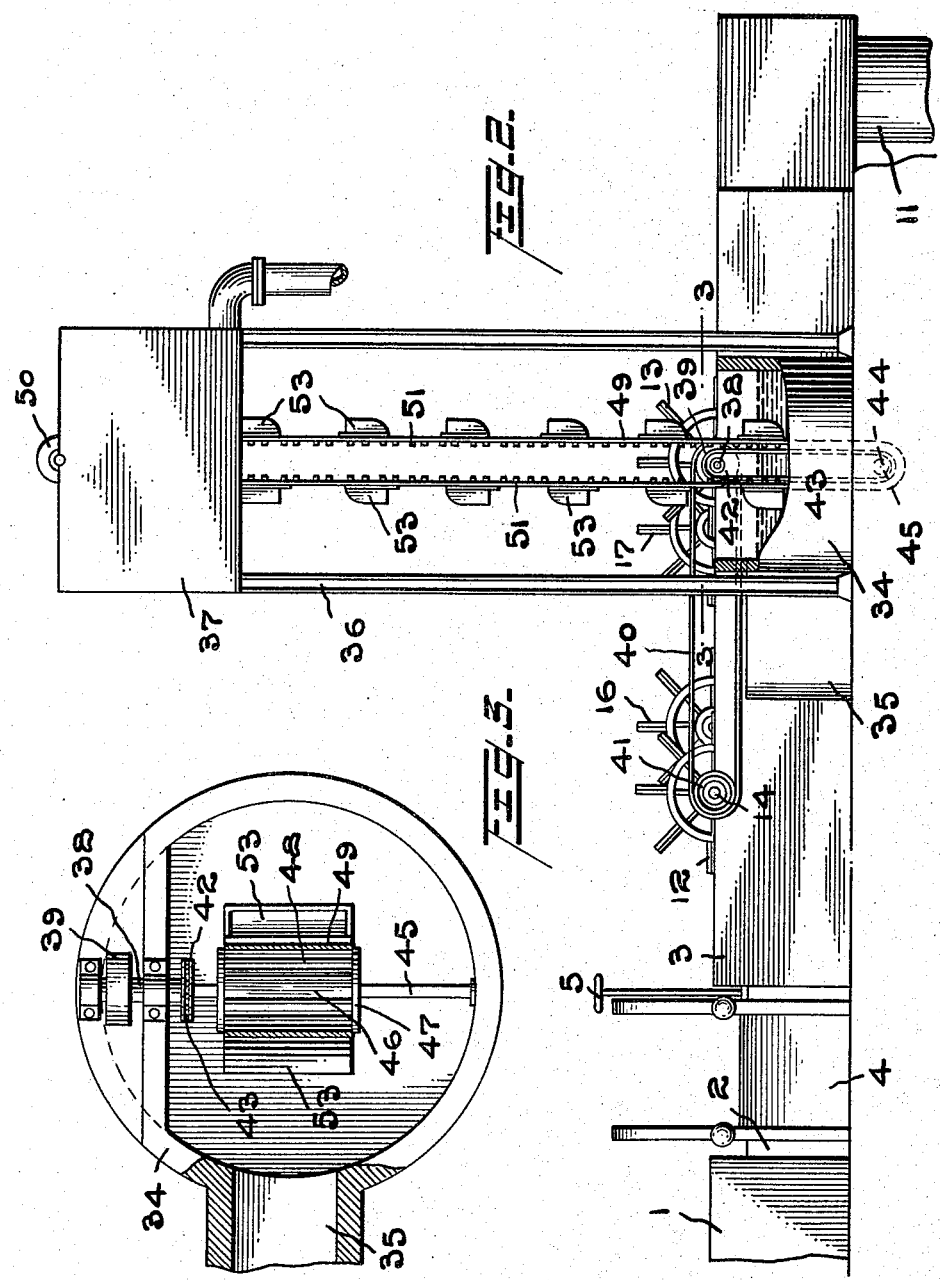
Witnesses
L. C. Moyer
C. R. Ziegler.
Inventor
Samuel B. Goff,
By Joshua R. H. Potts.
His Attorney

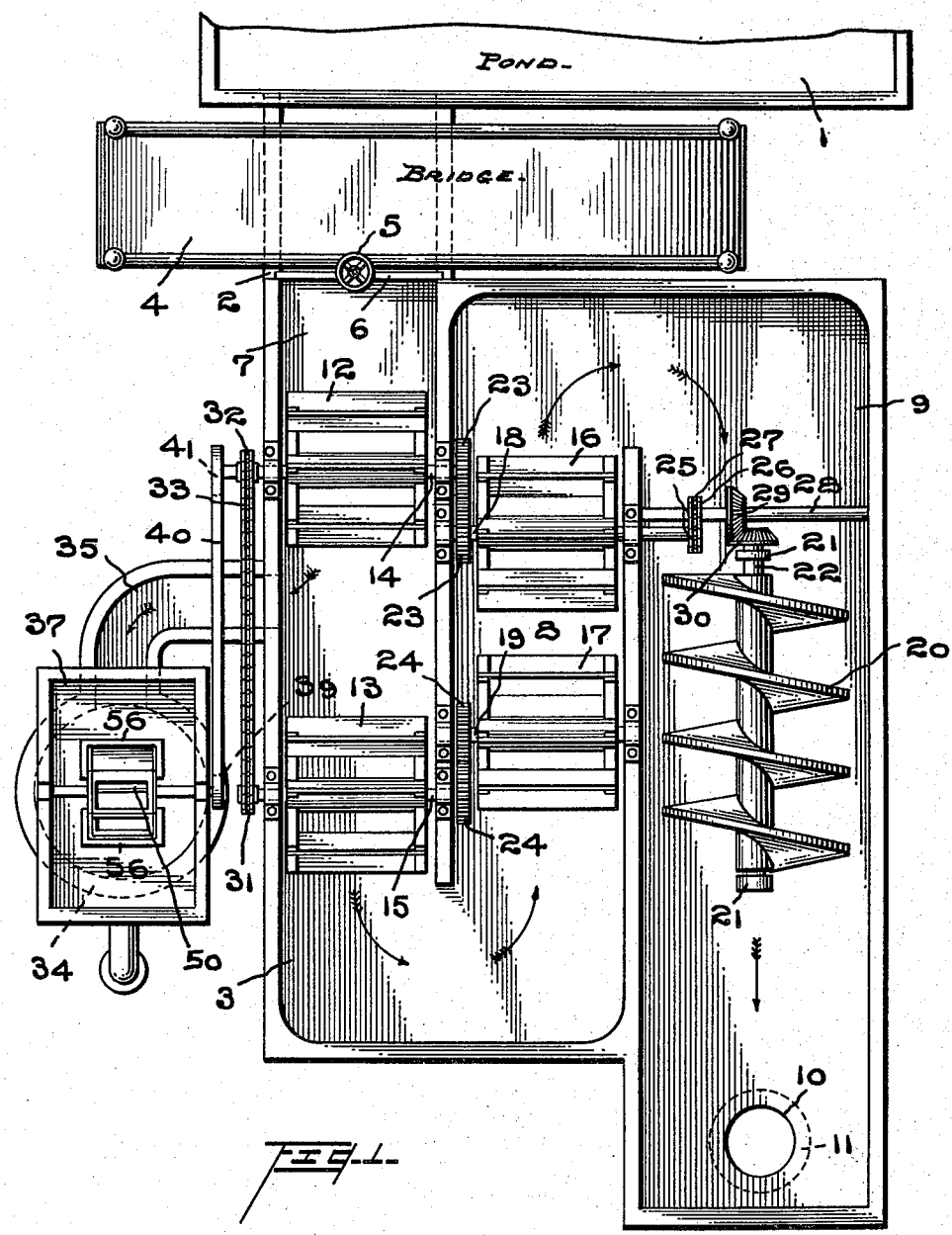

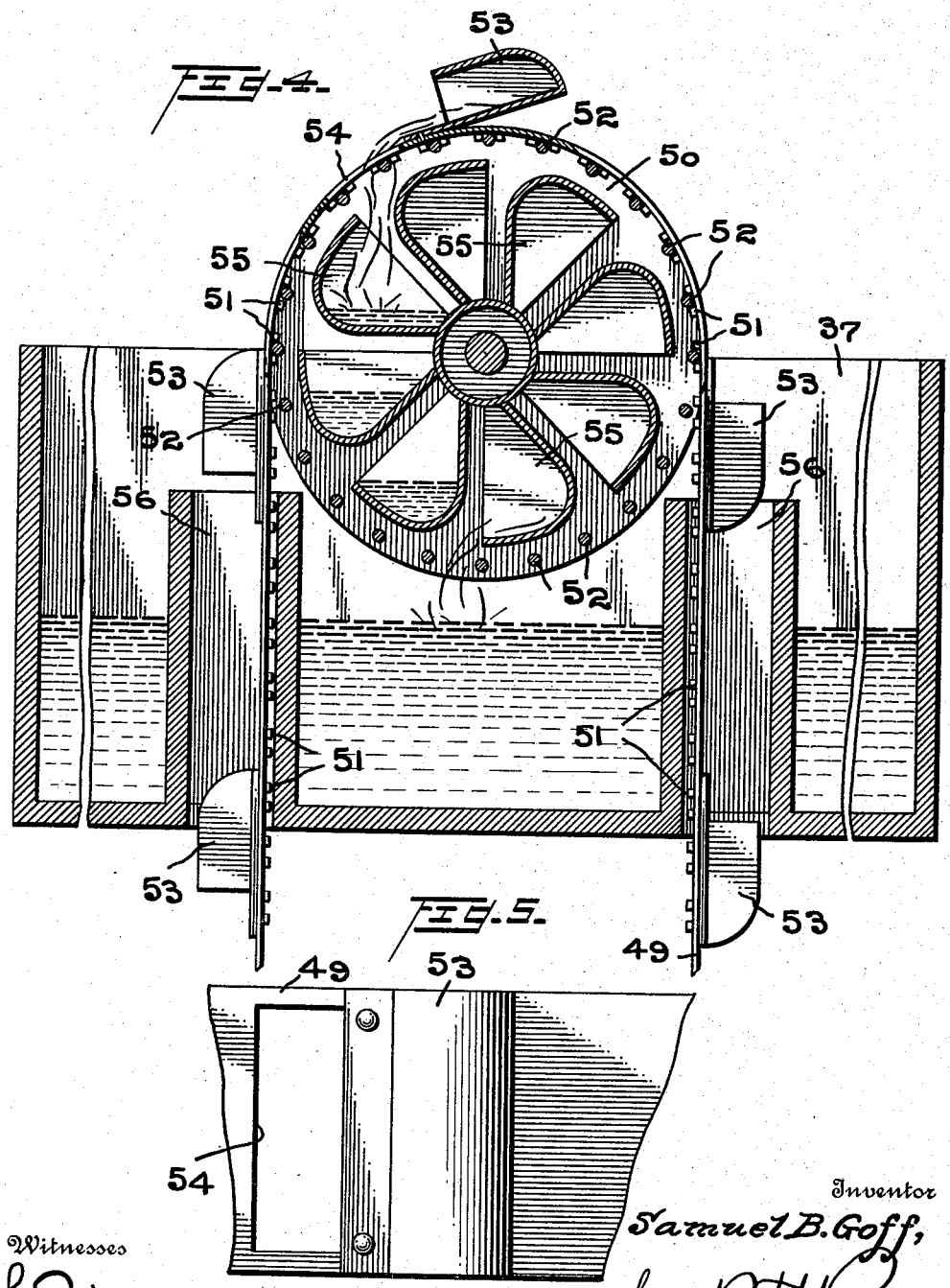

UNITED STATES PATENT OFFICE.

SAMUEL B. GOFF, OF CAMDEN, NEW JERSEY.

WATER-ELEVATING APPARATUS.

1,166,671.   Specification of Letters Patent.   Patented Jan. 4, 1916.

Application filed December 18, 1914. Serial No. 877,854.

*To all whom it may concern:*

Be it known that I, SAMUEL B. GOFF, a citizen of the United States, residing at Camden, in the county of Camden and State of New Jersey, have invented certain new and useful Improvements in Water-Elevating Apparatus, of which the following is a specification.

My invention relates to improvements in water elevating apparatus, the object of the invention being to utilize water in its rapid flow through a race to turn propellers, and the latter constructed to operate an improved water lifting mechanism.

A further object is to provide an improved arrangement of endless conveyer consisting of a series of buckets adapted to empty into buckets of a water wheel, so that the weight of water as it falls from the conveyer buckets assists the turning movement of the water wheel.

With these and other objects in view, the invention consists in certain novel features of construction and combinations and arrangements of parts as will be more fully hereinafter described and pointed out in the claims.

In the accompanying drawings: Figure 1 is a top plan view illustrating my improved apparatus. Fig. 2 is a view in side elevation partly broken away. Fig. 3 is a view in horizontal section on the line 3—3 of Fig. 2. Fig. 4 is a view in vertical longitudinal section through the water tank, illustrating on an enlarged scale the construction of water wheel with the conveyer buckets discharging thereinto, and Fig. 5 is a fragmentary view in elevation of the endless conveyer.

1 represents a water supply pond, which directs the water through a passage 2 into my improved race 3.

4 is a bridge over the passage 2, and from this bridge, the hand wheel 5 may be conveniently operated to raise and lower the gate 6 to control the flow of water to the race 3. This race 3 is preferably composed of cement or composition, and comprises three raceways 7, 8, and 9 respectively.

The raceway 7, which communicates with the passage 2, is narrower than the other raceways, and at its end communicates with the intermediate raceway 8 which is slightly wider than raceway 7, and this raceway 8 communicates at its end with the raceway 9, said raceway 9 being the widest of the three. The raceway 9 is provided in its bottom, at its outlet end with an opening 10 through which the water falls, and is directed by a vertical pipe 11 onto a turbine (not shown), or utilized in any other way to generate power. In the raceway 7, I locate two water wheels 12 and 13, and secure them upon shafts 14 and 15 respectively. In raceway 8, I locate two water wheels 16, and 17, and secure them upon shafts 18 and 19 respectively. In raceway 9, I locate a screw propeller 20 secured upon a shaft 22 supported in bearings 21. It is to be understood that the invention is not limited to any particular number of these water wheels and propellers, but it is my intention to provide them in each of the raceways so as to secure the power of the water flowing therethrough. It is also to be understood that it is my intention to give the several raceways a slight incline so that the water will flow rapidly through the same, but in any event there will be a rapid flow of water because of the fact that the water falls through the opening 10, and a continuous supply is necessary to maintain a level at this outlet end.

To compel the several water wheels and propeller to operate in unison, I connect them as follows: Shafts 14 and 18 are connected by meshing gears 23, while shafts 15 and 19 are connected by meshing gears 24. Shaft 18 is provided with a sprocket wheel 25 connected by a chain 26 with a sprocket wheel 27 on a shaft 28 extending across raceway 9. On this shaft 28, a beveled gear 29 is secured, and meshes with a beveled gear 30 on shaft 22. The shafts 14 and 15 which project beyond one side of the race, are provided with sprocket wheels 31 and 32 respectively connected by a sprocket chain 33, so that by this means all of the water wheels and propeller are compelled to operate in unison, and to exert a common power.

34 represents a well in which a level of water is maintained as it is connected by a canal 35 with the raceway 7. A tower 36 extends above the well 34, and supports at its upper end, a tank 37, to which the water is carried from the well as will now be described.

38 represents a shaft supported at the top of the well 34, and having a pulley 39 thereon connected by a belt 40 with a pulley 41 on shaft 14. On the shaft 38, inside of the well, a sprocket wheel 42 is secured, and is connected by a chain 43 with a sprocket wheel 44 on a shaft 45, extending transversely of the well adjacent the bottom thereof. On the shaft 45, a drum 46 is secured consisting of disks 47 spaced apart and connected by longitudinal rods 48. This drum 46 constitutes a driving mechanism for an endless belt conveyer 49, which passes around the drum 46 at its lower end, and at its upper end passes over my improved water wheel 50.

The belt 49 is provided on its inner face with transverse slats 51, which engage opposite sides of the rods 48 of drum 46, and which also engage opposite sides of rods 52 on water wheel 50. The belt 49 is provided on its outer face with a series of buckets 53 open at one end, and connected at their open ends to the belt as shown clearly in Fig. 4. To best accomplish this, the inner walls of the buckets are extended above the open end, and secured so that the buckets are free to tilt or incline away from the belt as the latter travels around the water wheel 50. The belt is provided with openings 54 through which the water can readily flow into buckets 55 of the water wheel 50. This water wheel 50 is formed with a circular series of buckets 55 radially positioned, and deepest at their outer portions, so that the water as it falls from the conveyer buckets 53 will enter the water wheel buckets 55, and the fall of the water as well as the weight of the water will be utilized to turn the water wheel and assist the water elevating means above described. The tank 37 is provided with vertical tubes 56 through which the two runs of the endless conveyer pass, and it will be noted that the water in falling from the buckets 55 of the water wheel will drop into the tank between the tubes 56, so that it cannot escape from the tank.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with an elevated tank having tubes extending upwardly from the bottom thereof, a water wheel supported in the tank between the tubes and having a circular series of radially positioned buckets, an endless conveyer, the runs of which extending through the tubes, and buckets on the conveyer adapted to discharge into the buckets of the water wheel, substantially as described.

2. The combination with an elevated tank having tubes extending upwardly from the bottom thereof, a water wheel supported in the tank between the tubes and having a circular series of radially positioned buckets, an endless conveyer, the runs of which extending through the tubes, said water wheel having a circular series of transverse rods, slats on the conveyer engaging opposite sides of the rods, and buckets on the conveyer discharging through openings in the conveyer into the buckets of the water wheel, substantially as described.

3. The combination with a well, a tank, and a tower supporting the tank above the well, of a water wheel in the tank, a drum in the well, an endless conveyer connecting the drum and the water wheel, buckets in the water wheel, buckets on the conveyer emptying into the buckets of the water wheel, and means for transmitting motion to the drum, substantially as described.

In testimony whereof I have signed my name to this specification in the presence of two subscribing witnesses.

SAMUEL B. GOFF.

Witnesses:
L. P. MAYER,
S. W. FOSTER.

Copies of this patent may be obtained for five cents each, by addressing the "Commissioner of Patents, Washington, D. C."